United States Patent
Ogasawara et al.

[11] Patent Number: 6,154,246
[45] Date of Patent: Nov. 28, 2000

[54] IMAGE PROCESSING APPARATUS AND IMAGE FORMING APPARATUS

[75] Inventors: Yoshimi Ogasawara, Shizuoka-ken; Manabu Sakakibara, Numazu, both of Japan

[73] Assignee: Canon Kabushiki Kaisha, Tokyo, Japan

[21] Appl. No.: 08/773,842

[22] Filed: Dec. 27, 1996

[30] Foreign Application Priority Data

Dec. 29, 1995 [JP] Japan ................................. 7-354208

[51] Int. Cl.[7] ................................................ B41J 2/435
[52] U.S. Cl. ........................ 347/250; 347/247; 347/248
[58] Field of Search .................................. 347/234, 235, 347/248, 250, 261, 132, 259; 327/270; 348/524, 537, 541

[56] References Cited

U.S. PATENT DOCUMENTS

4,862,289 8/1989 Shimada .................................. 347/259

*Primary Examiner*—N. Le
*Assistant Examiner*—Hai C. Pham
*Attorney, Agent, or Firm*—Fitzpatrick, Cella, Harper & Scinto

[57] ABSTRACT

In an image forming apparatus for forming an image by scanning a rotating photosensitive member with modulated light based on an image signal, a PLL circuit generates a high-frequency clock having a frequency n (n is an integer that satisfies n>2) times that of an oscillation output from a reference oscillating circuit. A frequency dividing circuit generates an image processing clock synchronized with the high-frequency clock and a detection signal from a scan light detecting mechanism. A latch circuit, a parallel/serial conversion circuit, and the like generate an image modulating signal by modulating image data on the basis of the high-frequency clock.

35 Claims, 8 Drawing Sheets

FIG. 4A  fr
FIG. 4B  8fo
FIG. 4C  4fo
FIG. 4D  /HD
FIG. 4E  PCLK
FIG. 4F  V(0..3)
FIG. 4G  PVDO
FIG. 4H  PRINT RESULT

IMAGE PROCESSING APPARATUS AND IMAGE FORMING APPARATUS

BACKGROUND OF THE INVENTION

1. Field of the Invention

The present invention relates to an image forming apparatus and an image processing apparatus and, more particularly, to an image forming apparatus for forming an image by scanning a rotating photosensitive member with modulated light based on an image signal, and an image processing apparatus for supplying an image signal to the image forming apparatus.

2. Related Background Art

A laser printer for forming an image on a sheet-like recording medium by scanning a photosensitive drum with a laser beam is known.

Figure 8:
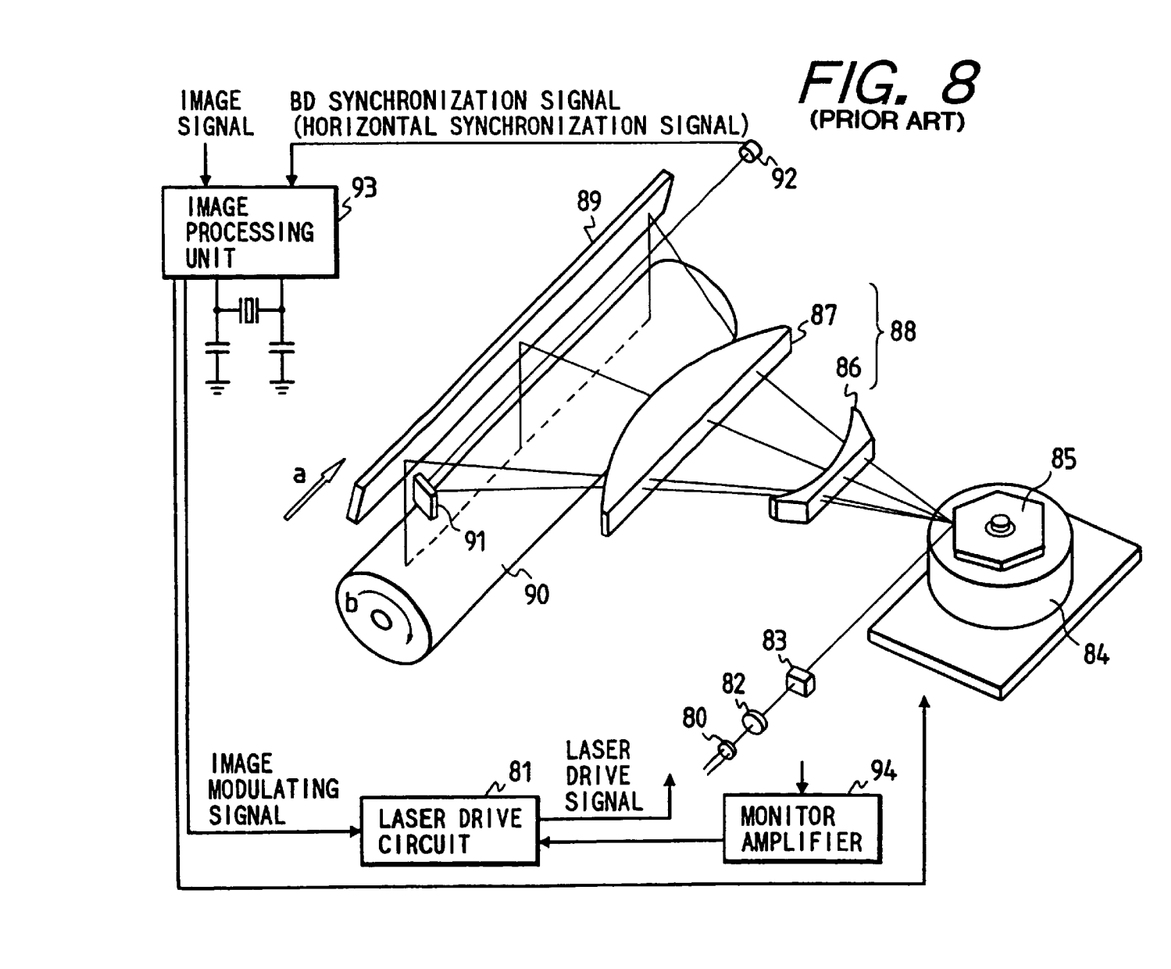
FIG. 8 is a view showing the arrangement of an optical scanner generally used in a conventional laser printer.

FIG. 8 is a view showing the arrangement of an optical scanner generally used for such a laser printer.

A semiconductor laser 80 as a component of a scanning optical system using a laser beam in the optical scanner is driven by a laser drive signal from a laser drive circuit 81 in accordance with an image modulating signal to emit a light-modulated laser beam. The laser beam emitted from the semiconductor laser 80 is incident through a collimator lens 82 and a cylindrical lens 83 on a rotating polyhedral mirror (to be referred to as a polygon mirror hereinafter) 85 driven by a scanner motor 84. The incident light is deflected by the polygon mirror 85. The laser beam deflected by the polygon mirror 85 serving as a deflector is formed into an image by an f-θ lens 88 constituted by a spherical lens 86 and a toric lens 87. Thereafter, the direction of the optical path of the light is changed by a reflecting mirror 89, and the light is irradiated on a photosensitive drum 90 which rotates at a constant speed.

The photosensitive drum 90 is sequentially scanned with this laser beam in a main scan direction a upon rotation of the polygon mirror 85 and in a sub-scan direction b upon rotation of the photosensitive drum 90 at predetermined timings. With this operation, an electrostatic latent image corresponding to the light-modulated laser beam is formed on the photosensitive drum 90 whose surface has been uniformly charged. This image is developed into a toner image by a developing device (not shown). The toner image is then transferred onto a sheet-like recording medium fed in the sub-scan direction b, and subjected to a fixing process, thereby completing the image formation process.

The laser beam from the polygon mirror 85 is reflected by a horizontal synchronization mirror 91 placed at a predetermined position outside an image formation area and detected by a horizontal synchronization signal monitor photodiode 92. As a result, a BD (Beam Detect) synchronization signal (to be referred to as a horizontal synchronization signal BD hereinafter) is generated. The timing of a main scan operation in a horizontal direction parallel to the axial direction of the photosensitive drum 90 is based on the horizontal synchronization signal BD. This horizontal synchronization signal BD serves as a reference signal for the timing of each process in the laser printer.

In addition, the horizontal synchronization signal BD is input to an image processing unit 93 for performing drive control on the scanner motor, image signal control, and the like to be synchronized with an image processing clock for image signal modulation which is generated by a crystal oscillator, thereby performing timing control for the start of image formation. That is, an image signal input to the image processing unit 93 is output, to the laser drive circuit 81, as an image modulating signal containing information associated with an image write start timing in the main scan direction which is controlled in accordance with the image processing clock. A laser deflection/scan operation is then executed by the route described above.

If timing variations occur for each main scan operation in the process of image formation start timing control, a print dot pattern is distorted. As a result, high-quality printing cannot be maintained. For this reason, image formation start timing control is performed on the basis of the horizontal synchronization signal BD, as described above. With this control, in sequentially performing a main scan operation, a first printed dot pattern is free from distortion.

A monitor amplifier 94 detects a current signal corresponding to the amount of light received by a photodiode (not shown) arranged near the emission area in the semiconductor laser 80, and performs APC control (Automatic Power Control; automatic light amount control) on a laser drive signal from the laser drive circuit 81 on the basis of this current signal such that the amount of light emitted from the semiconductor laser 80 becomes a standard light amount.

In the above case, a reference oscillator such as a crystal oscillator for oscillating/outputting an image processing clock is required to establish synchronization with an image processing clock for image signal modulation by using the horizontal synchronization signal BD and perform image formation start timing control. The horizontal synchronization signal BD is detected at an asynchronous timing with respect to the output phase of the reference oscillator. For this reason, an image modulating signal must be generated at the timing of an image processing clock for image signal modulation which is generated on the basis of the horizontal synchronization signal BD and can control the image formation start timing.

In order to control the image formation start timing with a precision of 1/n dot, the phase error between the horizontal synchronization signal BD and the image processing clock must be set to 1/n or less of the image processing clock period. The following conventional method has therefore been proposed. In this method, a highly stable reference oscillator such as a crystal oscillator is used, and the oscillation frequency is set to n times (n is a positive integer) the image processing clock frequency. An oscillation frequency Q times the clock frequency is frequency-divided in synchronism with the phase of the horizontal synchronization signal BD to generate an image processing clock for image signal modulation. With this method, the phase error between the horizontal synchronization signal BD and the image processing clock can be suppressed to 1/n or less of the image processing clock period.

In another case, a clock selection means is used. This clock selection means uses a delay line element having a plurality of output taps for a plurality of output signals with different delay times. In this arrangement, an image processing clock is input to the delay line element, and the phase of the clock is sequentially delayed in units of 1/n the image processing clock period. The resultant clocks are output to the respective output taps. Of these outputs, the tap output exhibiting the least phase error with respect to the phase of the horizontal synchronization signal BD is selected. The phase error can be reduced by using the selected clock as an image processing clock having undergone phase correction.

In the former case, if, for example, the image processing clock frequency is set to 18 MHz, and the phase error allowable value is set to ¹⁄₁₆ (n=16) dot, a crystal oscillator serving as a reference oscillator is required to have a high oscillation frequency of 448 MHz. It is, however, difficult to obtain a crystal oscillator having such a high frequency. Even if such an oscillator can be obtained, it costs too much.

In the latter case, since the delay time of the delay line element greatly varies, the delay time of each tap of the delay line element must be managed to realize a phase error of ¹⁄n dot or less. In practice, however, it is difficult to manage the delay time. Even if delay line elements which can realize an allowable phase error can be obtained, the yield of such elements is poor.

Assume that image data is to be subjected to pixel division modulation at intervals of ¹⁄k (k is a n arbitrary integer) of the image processing clock period. In this case, when parallel image data input at the image processing clock period is sequentially converted into serial data and output by using a clock having undergone a ¹⁄k phase shift, which is selectively output from the clock selection means using the delay line element, jitter corresponding to the variations of the delay line element may occur in the image data having undergone pixel division modulation. For this reason, only delay line elements which are free from variations and hence from phase errors may be selected and used. In this case, however, since the yield of these components is poor, the apparatuses become very expensive.

In both of the foregoing cases, a pha se error may be caused between the horizontal synchronization signal BD and an image processing clock owing to the finishing precision of the polygon mirror, and the image formation start timing of each scan line may be shifted, resulting in jitter in the formed image in the main scan direction. For this reason, only polygon mirrors with high finishing precision which do not cause any phase error may be selected and used. In this case, however, the apparatuses become very expensive.

SUMMARY OF THE INVENTION

The present invention has been made in consideration of the above situation, and has as its object to provide an image forming apparatus which can control the image formation start timing with a precision of ¹⁄n dot by reducing the phase error between a horizontal synchronization signal BD and an image processing clock to ¹⁄n or less of the period of the image processing clock with an inexpensive arrangement.

In order to obtain the above object, according to the present invention, there is provided an image forming apparatus which has scanning means for scanning a rotating photosensitive member with light modulated on the basis of an image signal and emitted from a light source, scan light detecting means, placed at a predetermined position with respect to the rotating photosensitive member, for detecting scan light from the scanning means, and a reference oscillator, and scans the rotating photosensitive member at a predetermined timing based on an oscillation output from the reference oscillator and a detection signal from the scan light detecting means to form an electrostatic latent image corresponding to the image signal, and forms an image corresponding to the electrostatic latent image on a recording medium, comprising high-frequency clock generating means for generating a high-frequency clock having a frequency n (n is an integer that satisfies n≧2) times that of an oscillation output from a reference oscillator, image processing clock generating means for generating an image processing clock synchronized with the detection signal from the scan light detecting means on the basis of the high-frequency clock and the detection signal from the scan light detecting means, and modulating means for generating an image modulating signal by modulating the image signal on the basis of the high-frequency clock, wherein the light source is driven on the basis of the image modulating signal.

In the apparatus of the present invention, the high-frequency clock generating means comprises a phase-locked loop circuit for performing control to generate the high-frequency clock phase-locked to an oscillation output from the reference oscillator.

In the apparatus of the present invention, the high-frequency clock generating means comprises the reference oscillator, reference oscillation frequency dividing means for frequency-dividing an oscillation output from the reference oscillator, and a phase-locked loop circuit for generating the high-frequency clock phase-locked to a frequency division output from the reference oscillation frequency dividing means.

In the apparatus of the present invention, the phase-locked loop circuit comprises phase comparing means for receiving the oscillation output or the frequency division output as a reference signal, a voltage-controlled oscillator for changing an oscillation output frequency on the basis of an output error signal from the phase comparing means, and frequency dividing means for performing ¹⁄n frequency division of an oscillation output from the voltage-controlled oscillator and supplying the resultant signal as a comparison signal to the phase comparing means.

In the apparatus of the present invention, the image processing clock generating means comprises synchronization signal generating means for generating a synchronization signal phase-locked to the detection signal, and high-frequency clock frequency dividing means for generating an image modulating clock by frequency-dividing the high-frequency clock when the synchronization signal has a predetermined logic value, and stopping generation of the image modulating clock when the synchronization signal has another logic value.

In the apparatus of the present invention, the synchronization signal generating means comprises reset signal generating means for generating a reset signal synchronized with the detection signal, and a flip-flop which has a data input terminal set at high level and outputs the synchronization signal on the basis of the reset signal and the detection signal.

In the apparatus of the present invention, the synchronization signal generating means comprises an edge detecting circuit for detecting an edge of the detection signal in synchronism with the high-frequency clock, a counter for counting clock pulses of the high-frequency clock and outputting one pulse in a cycle of n clock pulses, and a flip-flop having an output whose logic value is inverted in accordance with the pulse and an output from the edge detecting circuit.

In the apparatus of the present invention, the high-frequency clock frequency dividing means outputs an image modulating clock for generating the image modulating signal by performing ¹⁄k (k is an arbitrary integer that satisfies k≦n) frequency division of the high-frequency clock, and outputs an image processing clock obtained by performing ¹⁄m (m is an arbitrary integer that satisfies m<k≦n) frequency division of the high-frequency clock.

In the apparatus of the present invention, the modulating means comprises a latch circuit for latching the parallel image signal in response to the image processing clock, and parallel/serial conversion means for converting an output from the latch circuit into serial data at the timing of the image modulating clock.

In the apparatus of the present invention, the high-frequency clock generating means, the image processing clock generating means, and the modulating means are formed into an integrated circuit.

DETAILED DESCRIPTION OF THE PREFERRED EMBODIMENTS

The embodiments of the present invention will be described in detail below with reference to the accompanying drawings.

(First Embodiment)

Figure 1:
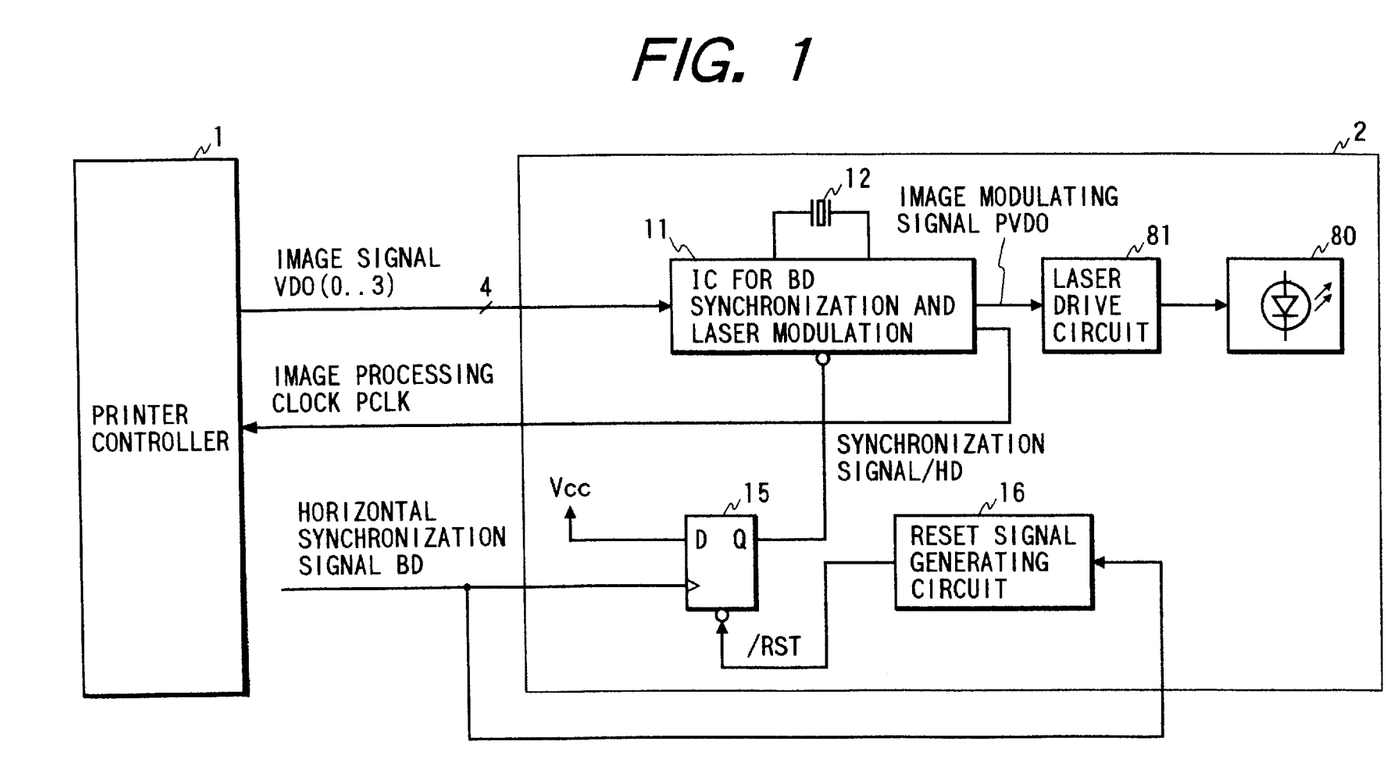
FIG. 1 is a block diagram showing an image forming apparatus according to the first embodiment of the present invention.
Figures 2A, 2B:
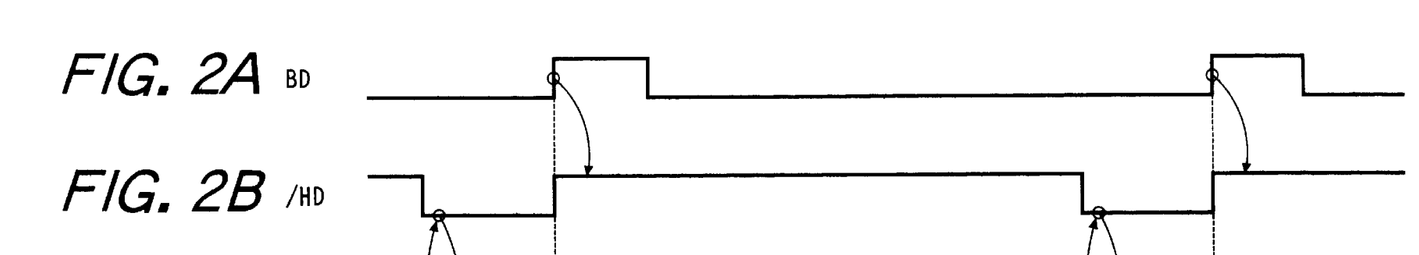
FIGS. 2A, 2B, 2C and 2D are timing charts for explaining generation of a synchronization signal $\overline{HD}$ and an image processing clock $\overline{PCLK}$.
Figure 2C:
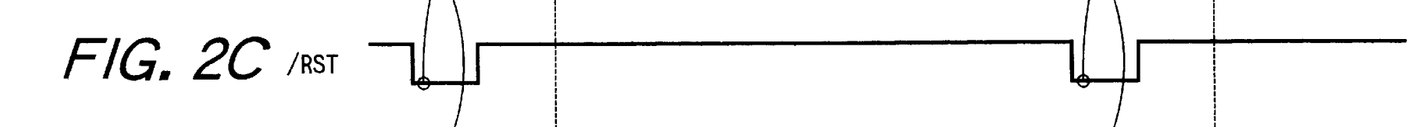
Figure 2D:
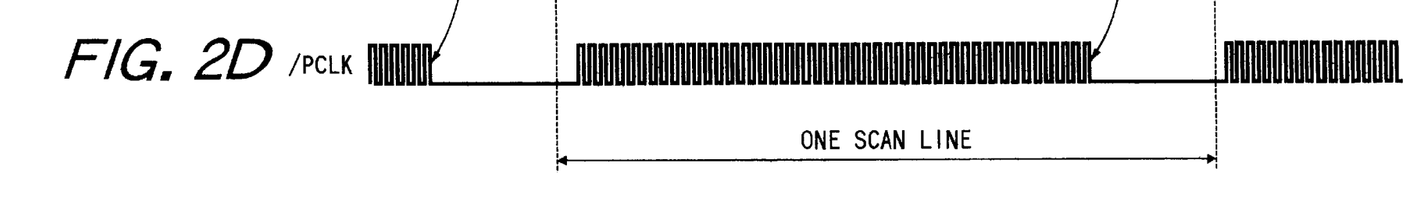

FIG. 1 is a block diagram showing an image forming apparatus according to the first embodiment of the present invention.

The image forming apparatus shown in FIG. 1 is a laser printer, which is mainly constituted by a printer controller 1, a printer engine 2, and an optical scanner (not shown). This optical scanner includes the constituent elements 82, . . . , 89, and 94.

The printer controller 1 develops an image code sent from a host computer, which is an external unit, into bit map data, and supplies the data, as 4-bit parallel image data VDO (0, . . . , 3) synchronized with a 600-dpi image processing clock PCLK, to the printer engine 2.

The printer engine 2 includes an IC (integrated circuit) 11 for BD synchronization and laser modulation for performing laser modulation for the image data VDO (0, . . . , 3) in BD synchronization (in synchronism with a horizontal synchronization signal BD), and generating an image processing clock PCLK, a crystal oscillator 12 externally attached to the IC 11, a laser drive circuit 81 for generating a laser drive signal from an image modulating signal PVDO having undergone laser modulation in BD synchronization, and a semiconductor laser 80 for emitting light in accordance with a laser drive signal from the laser drive circuit 81. The semiconductor laser 80 is a component of the optical scanner in FIG. 8.

As will be described later, the IC 11 generates the image processing clock PCLK, and also generates the image modulating signal PVDO modulated as 2,400-dpi serial data by performing parallel/serial conversion with respect to the 4-bit parallel image data VDO (0, . . . , 3) in synchronism with the horizontal synchronization signal BD. The generated image modulating signal PVDO is used to control the semiconductor laser 80 through the laser drive circuit 81 to scan and expose a photosensitive drum 90 (see FIG. 8), thereby forming and printing an image on a sheet-like recording medium, as described above.

The printer engine 2 further includes a D flip-flop (to be referred to as a D-F/F hereinafter) 15 and a reset signal generating circuit 16. A data input terminal D of the D-F/F 15 is connected to a power supply voltage Vcc and set at high level. A horizontal synchronization signal BD from a horizontal synchronization signal monitor photodiode 92 (see FIG. 8) is supplied to the clock input terminal of the D-F/F 15 and the input terminal of the reset signal generating circuit 16. These operations will be described in detail below with reference to FIGS. 2A to 2D.

FIGS. 2A to 2D are timing charts for explaining generation of a synchronization signal $\overline{HD}$ and the image processing clock PCLK.

The synchronization signal $\overline{HD}$ (see FIG. 2B) appearing at the output terminal of the D-F/F 15 goes from low level to high level in synchronism with the leading edge of the horizontal synchronization signal BD (see FIG. 2A) indicating a reference for the start of printing. When the synchronization signal $\overline{HD}$ is set at high level, the IC 11 starts operating to generate the image processing clock PCLK (see FIG. 2D) synchronized with the synchronization signal $\overline{HD}$, as will be described later.

The reset signal generating circuit 16 outputs a reset signal $\overline{RST}$ (see FIG. 2C) which goes from high level to low level when a predetermined period of time has elapsed from the timing of the leading edge of the horizontal synchronization signal BD and the laser exceeds an effective image formation area. With this operation, the D-F/F 15 is reset, and the synchronization signal $\overline{HD}$ is set at low level. As a result, the generation of the image processing clock PCLK is stopped. The reset signal $\overline{RST}$ is restored to high level at a predetermined timing, and arrival of a horizontal synchronization signal BD corresponding to the next scan beam is waited. In this manner, the synchronization signal $\overline{HD}$ for the IC 11 which is phase-locked to the horizontal synchronization signal BD is generated.

Figure 3:
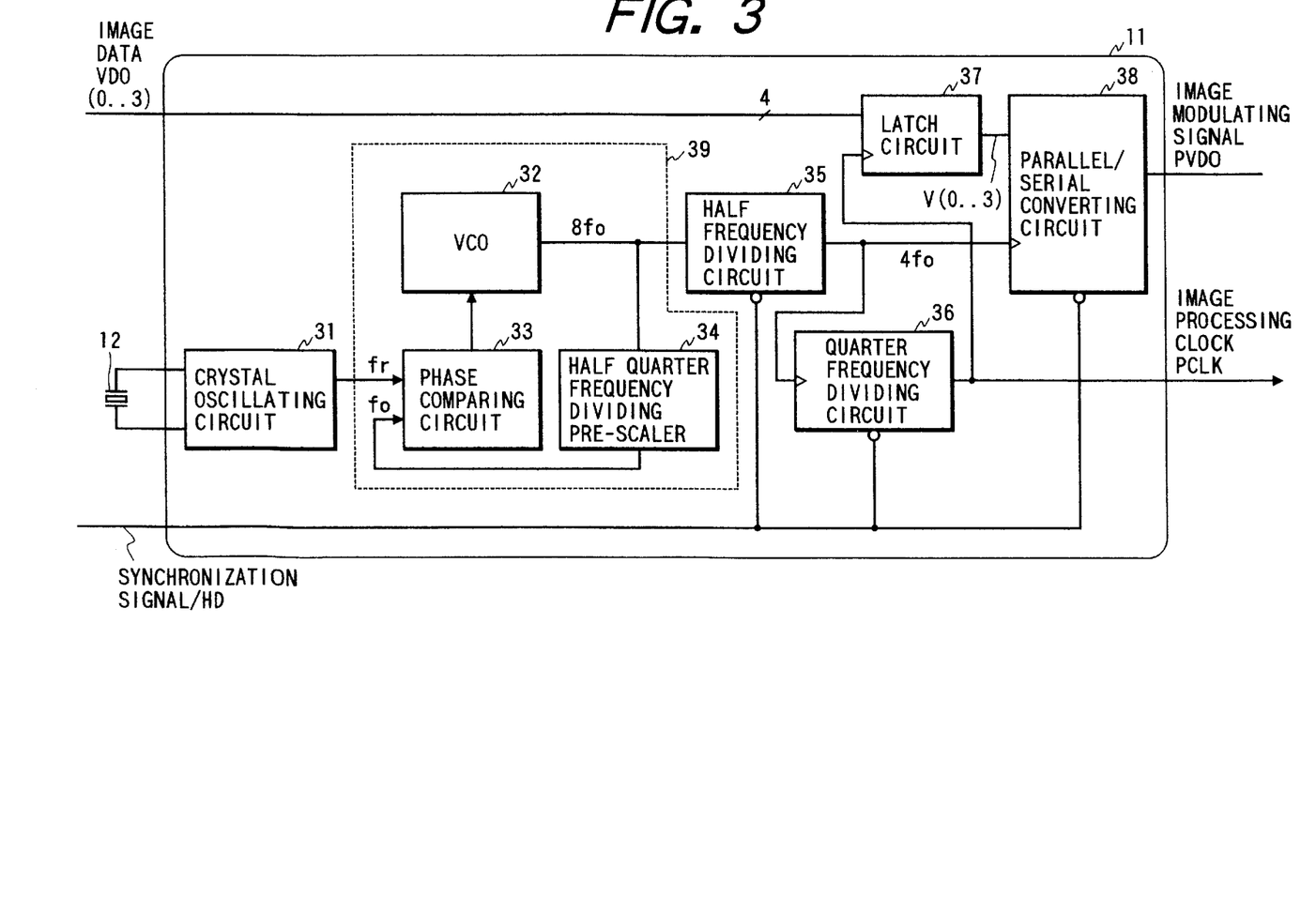
FIG. 3 is a block diagram showing the internal arrangement of an IC 11 for BD synchronization and laser modulation.

FIG. 3 is a block diagram showing the internal arrangement of the IC 11 for BD synchronization and laser modulation.

The IC 11 is constituted by a crystal oscillating circuit 31 to which the crystal oscillator 12 is externally attached, a VCO (Voltage-Controlled Oscillator) 32, a phase comparing circuit 33, a half quarter frequency dividing pre-scaler 34, a half frequency dividing circuit 35, a quarter frequency dividing circuit 36, a latch circuit 37, and a parallel/serial conversion circuit 38. Of these components, the VCO 32, the phase comparing circuit 33, and the half quarter frequency dividing pre-scaler 34 constitute a PLL (Phase-Locked Loop) circuit 39.

FIGS. 4A to 4H are timing charts showing the waveforms of signals at the respective portions in FIG. 3.

The crystal oscillating circuit 31 oscillates/outputs a reference clock fr (see FIG. 4A) having the same clock frequency as that of a desired 600-dpi image processing clock PCLK, and supplies it as a reference signal to the phase comparing circuit 33. An output fo obtained by performing half quarter frequency division of an oscillation output from the VCO 32, whose oscillation output frequency is changed on the basis of an output error signal from the phase comparing circuit 33, by using the half quarter frequency dividing pre-scaler 34 is supplied as a comparison signal to the phase comparing circuit 33. The phase of this signal is compared with that of the reference clock fr. As a result, the PLL circuit 39 generates an eighth harmonic clock 8fo (see FIG. 4B) which is phase-locked to the reference clock fr and has undergone eight-times frequency multiplication.

Figures 4A, 4B:
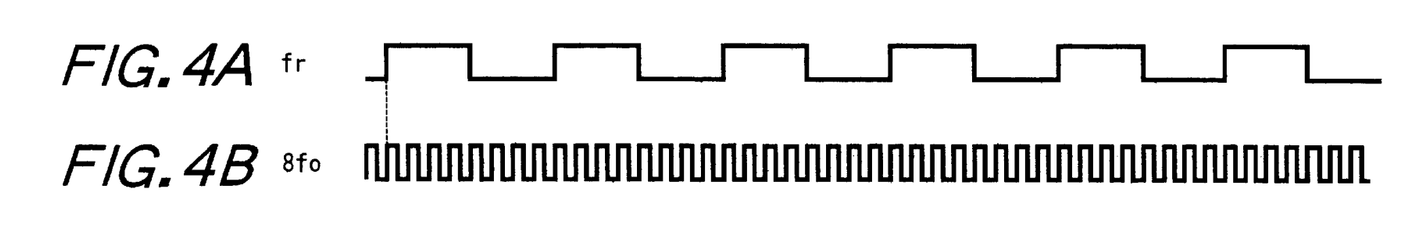
FIGS. 4A, 4B, 4C, 4D, 4E, 4F, 4G, and 4H are timing charts showing the waveforms of signals at the respective portions of the IC 11.
Figure 4C:
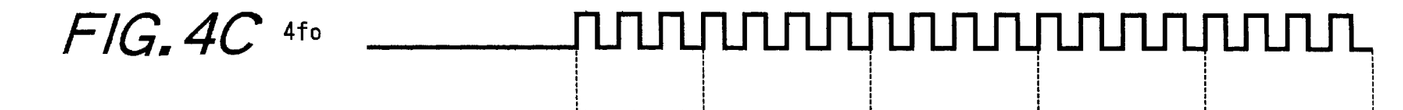
Figure 4D:
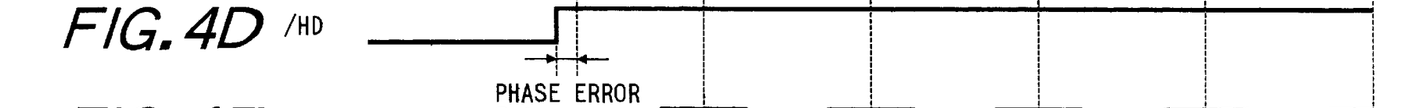
Figures 4E, 4F:
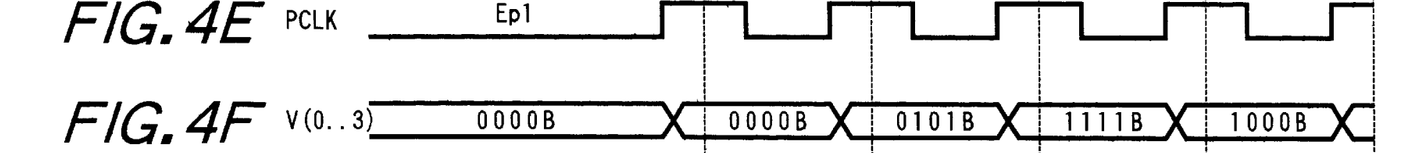
Figure 4G:
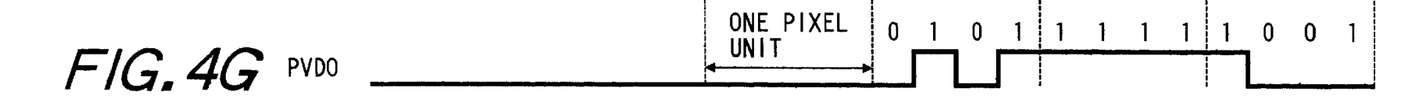

This operation is a free run operation, and the eighth harmonic clock 8fo is not reset by the synchronization signal $\overline{HD}$ (see FIG. 4D). The half frequency dividing circuit 35 starts half frequency division of the eighth harmonic clock 8fo in synchronism with the timing at which the synchronization signal $\overline{HD}$ is set at high level, and outputs a fourth harmonic clock 4fo (see FIG. 4C). A phase error Ep1 between the synchronization signal $\overline{HD}$ and the fourth harmonic clock 4fo is suppressed to one period or less of the eighth harmonic clock 8fo having the maximum frequency (see FIGS. 4B to 4D).

The quarter frequency dividing circuit 36 starts quarter frequency division of the fourth harmonic clock 4fo in synchronism with the timing at which the synchronization signal $\overline{HD}$ is set at high level, and outputs an image processing clock PCLK (see FIG. 4E) which has the same frequency as that of the output fo and is completely synchronized with the fourth harmonic clock 4fo. Therefore, the phase error between the image processing clock PCLK and the synchronization signal $\overline{HD}$ is suppressed to one period or less of the eighth harmonic clock 8fo.

Figure 4H:
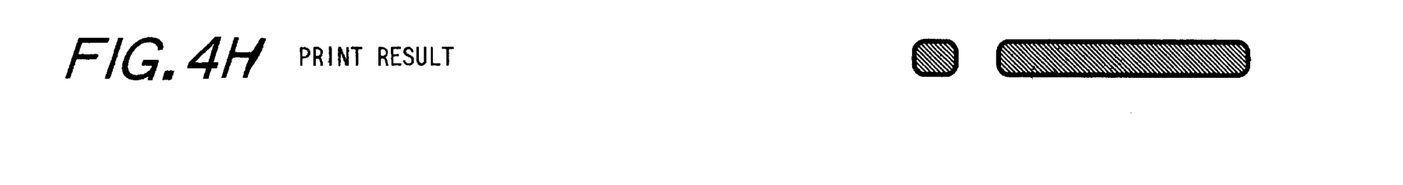

Meanwhile, 600-dpi, 4-bit parallel image data VDO (0, . . . , 3) (see FIG. 4F) is latched by the latch circuit 37 in accordance with the image processing clock PCLK and supplied to the parallel/serial conversion circuit 38. The parallel/serial conversion circuit 38 converts the image data into serial data and outputs it. As a result, 2,400-dpi, 1-bit serial image modulating signal PVDO (see FIG. 4G) is obtained. The semiconductor laser 80 emits light in accordance with a laser drive signal from the laser drive circuit based on this image modulating signal PVDO. As a result, a print result like the one shown in FIG. 4H is obtained in the main scan direction.

According to this embodiment, the PLL circuit 39 generates the eighth harmonic clock 8fo by performing eight-times frequency multiplication of the output fo from the half quarter frequency dividing pre-scaler 34 which is phase-locked to the reference clock fr from the crystal oscillating circuit 31. In addition, synchronization control of the phase of the fourth harmonic clock 4fo, which is obtained by frequency-dividing the eighth harmonic clock 8fo having a higher frequency than the image processing clock PCLK, is performed on the basis of a detection signal (horizontal synchronization signal BD) from the horizontal synchronization signal monitor photodiode 92 using the polygon mirror 85. This synchronized clock 4fo is frequency-divided. As a result, the eighth harmonic clock 8fo is subjected to half quarter frequency division to generate the image processing clock PCLK.

With this operation, the phase error between the horizontal synchronization signal BD and the image processing clock PCLK can be suppressed to $\overline{1/8}$ or less the period of the image processing clock PCLK. For this reason, the start timing of image formation in the main scan direction can be controlled within one period or less of the eighth harmonic clock 8fo, and the jitter in the main scan direction can be controlled on an allowable level of a dot precision of $1/n$ (n is a multiplication number with respect to the reference clock fr for a clock having the maximum frequency; 8 in this case). By using a quartz oscillating circuit having a low oscillation frequency equal to or lower than the image processing clock, a high-quality image can be formed without using any unnecessarily expensive high-frequency crystal oscillator. In addition, since any crystal oscillator having an unnecessarily high oscillation frequency is not required, little unnecessary radiation occurs, and stable, high-precision image formation timing control can be performed.

Furthermore, parallel/serial conversion of 4-bit parallel image data V (0, . . . , 3) input at an image processing clock period is performed by using the fourth harmonic clock 4fo (a multiplication number k of this clock may be an arbitrary integer that satisfies $k \leq n$) having a frequency four times that of the image processing clock PCLK which is easily generated by only frequency-dividing an eighth harmonic clock. With this operation, pixel division modulation processing of performing a high-speed serial output operation can be performed at a rate four times the image processing clock PCLK (at a period $1/k$ the image processing clock period).

In the above embodiment, the multiplication number set in the PLL circuit 39 is 8. However, this number is only an example. For example, the multiplication number n may be an arbitrary integer that satisfies $n \geq 2$. The synchronization precision with respect to the horizontal synchronization signal BD can be improved by increasing the multiplication number in the PLL circuit using, for example, a 1/16 pre-scaler. If very high synchronization precision is not required, the multiplication number can be decreased. In order to decrease the multiplication number, a frequency dividing circuit may be arranged between the crystal oscillating circuit 31 and the phase comparing circuit 33.

In the above embodiment, one pixel is divided into four portions (4-bit parallel/serial conversion). However, the division number can be arbitrarily set within the range in which parallel/serial conversion can be performed with the multiplication number in the PLL circuit 39. That is, if the multiplication number in the PLL circuit 39 is 8, one pixel can be divided into a maximum of eight portions (8-bit parallel/serial conversion) by omitting the half frequency dividing circuit 35.

In the first embodiment, the external circuits attached to the IC 11 generate the reset signal RST on the basis of the horizontal synchronization signal BD and input it to the IC 11. For this reason, the interval in which the image processing clock PCLK is disabled is determined depending on the external circuits (the D-F/F 15 and the reset signal generating circuit 16) attached to the IC 11.

(Second Embodiment)

Figure 5:
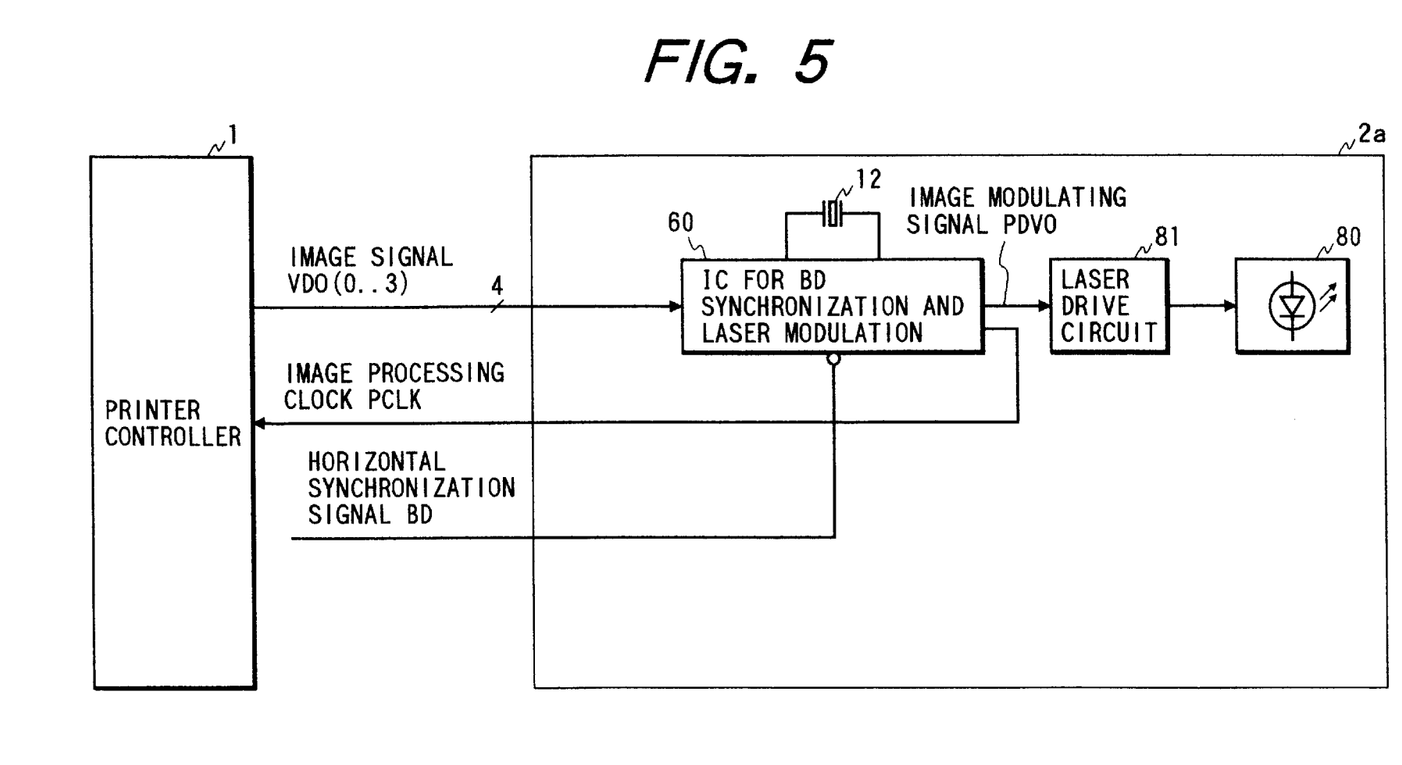
FIG. 5 is a block diagram showing an image forming apparatus according to the second embodiment of the present invention.

FIG. 5 is a block diagram showing an image formation apparatus according to the second embodiment of the present invention. In the second embodiment, in an IC, a horizontal synchronization signal is converted into a reset signal $\overline{RST}$ to perform horizontal synchronization and laser modulation. The same reference numerals in FIG. 5 denote the same parts as in the first embodiment, and a description thereof will be omitted.

The image forming apparatus shown in FIG. 5 is a laser printer, which is mainly constituted by a printer controller 1 and a printer engine 2a. The printer engine 2a includes an IC 60 for BD synchronization and laser modulation which performs laser modulation for image data VDO (0, . . . , 3) in BD synchronization and also generates a image processing clock PCLK, an external crystal oscillator 12, a laser drive circuit 81, and a semiconductor laser 80.

Figure 6:
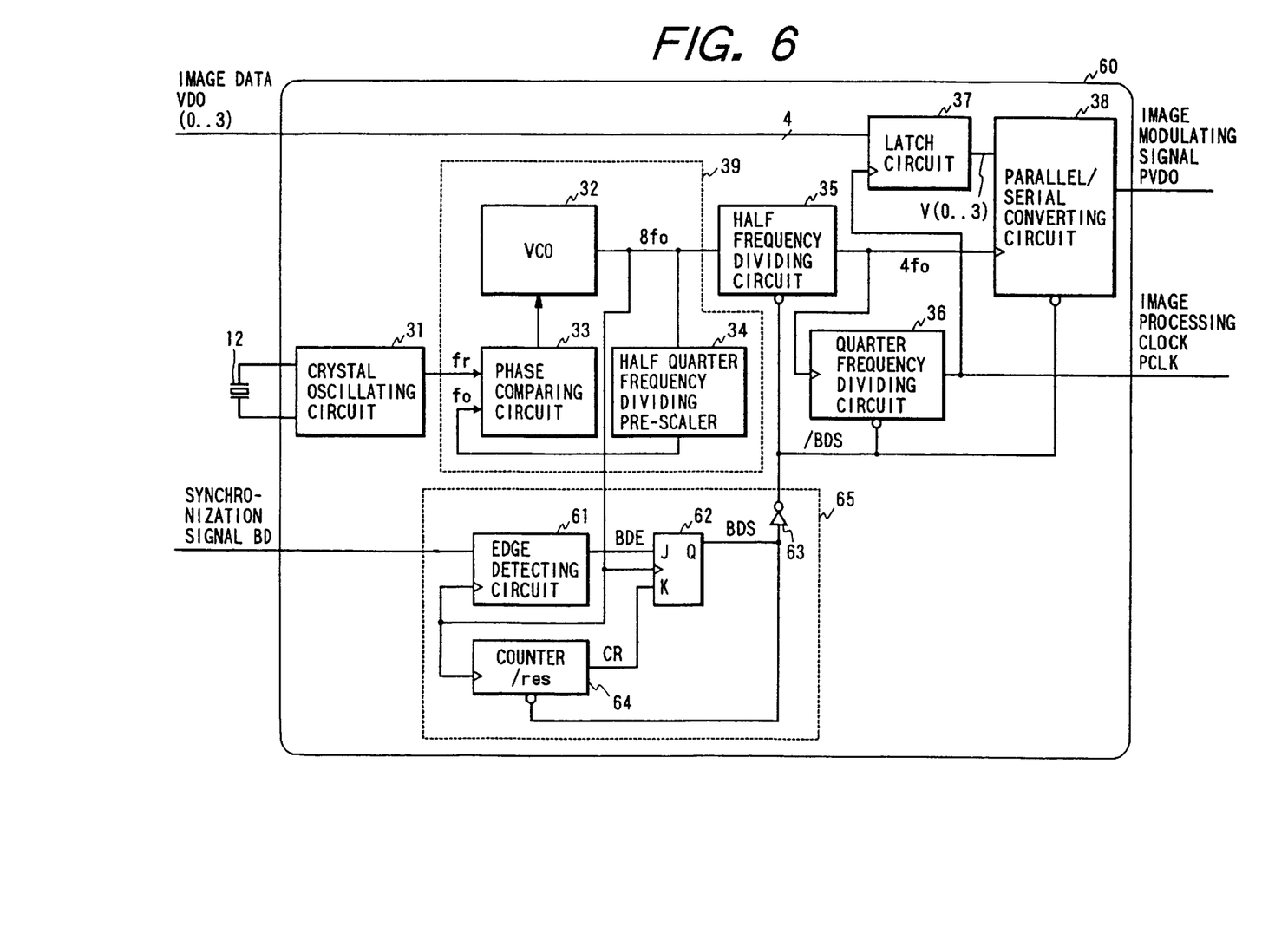
FIG. 6 is a block diagram showing the internal arrangement of an IC 60 for BD synchronization and laser modulation.

FIG. 6 is a block diagram showing the internal arrangement of the IC 60 for BD synchronization and laser modulation.

The IC 60 is constituted by a block identical to the internal block of the IC 11 (a crystal oscillating circuit 31 to which a crystal oscillator 12 is externally attached, a VCO 32, a phase comparing circuit 33, a half quarter frequency dividing pre-scaler 34, a half frequency dividing circuit 35, a quarter frequency dividing circuit 36, a latch circuit 37, and a parallel/serial conversion circuit 38) and a block (an edge detecting circuit 61, a JK flip-flop (to be referred to as a JK-F/F hereinafter) 62, an inverter 63, and a counter 64) which is not included in the IC 11.

A BD synchronization unit 65 is constituted by the edge detecting circuit 61 for detecting the leading edge of a horizontal synchronization signal BD and outputting a horizontal synchronization signal edge detection pulse BDE having a predetermined width, a counter 64 for outputting one carry signal CR, which is a pulse having a predetermined width, every time it counts eight clock pulses of an eighth harmonic clock 8fo from a PLL circuit 39, a JK-F/F 62 for outputting a first horizontal synchronization output BDS, whose logic value is inverted in synchronism with the eighth harmonic clock 8fo, upon detecting the leading edges of the horizontal synchronization signal edge detection pulse BDE and the carry signal CR, and the inverter 63 for outputting a horizontal synchronization output $\overline{BDS}$ obtained by inverting the logic value of the first horizontal synchronization output BDS. The BD synchronization unit 65 generates the second horizontal synchronization output $\overline{BDS}$ synchronized with the horizontal synchronization signal BD on the basis of the horizontal synchronization signal BD.

FIGS. 7A to 7K are timing charts showing the waveforms of signals at the respective portions in FIG. 6.

The BD synchronization unit 65, in which the second embodiment differs from the first embodiment, will be described below with reference to FIGS. 7A to 7K.

Figure 7A:
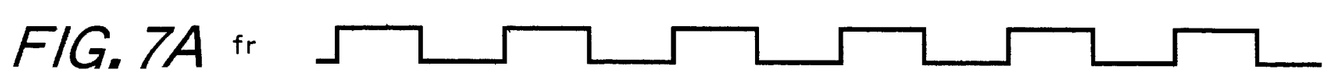
FIGS. 7A, 7B, 7C, 7D, 7E, 7F, 7G, 7H, 7I, 7J, and 7K are timing charts showing the waveforms of signals at the respective portions of the IC 60.
Figure 7B:
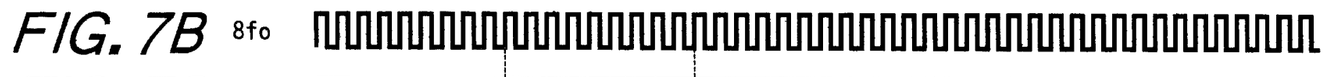
Figure 7C:
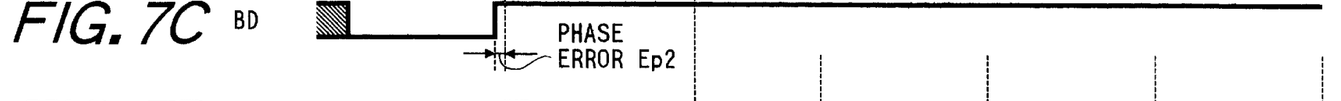
Figure 7D:
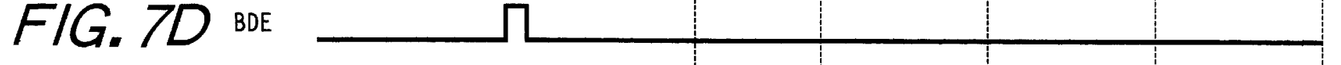
Figure 7E:
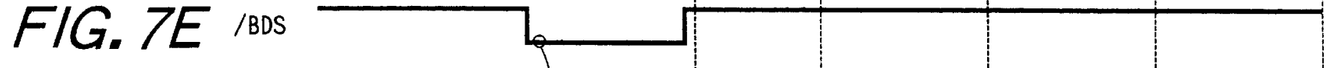
Figure 7F:
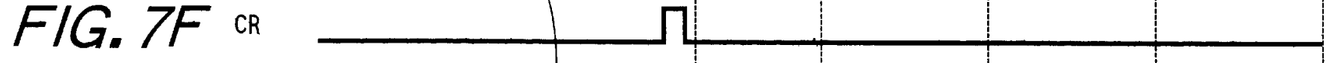
Figure 7G:
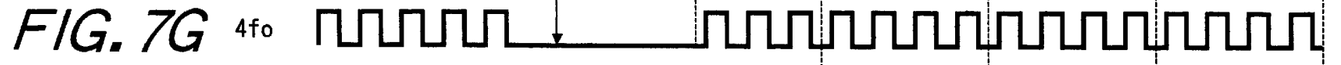

The edge detecting circuit 61 detects the leading edge of the input horizontal synchronization signal BD, and outputs the horizontal synchronization signal edge detection pulse BDE (see FIG. 7D). A sampling error based on the eighth harmonic clock 8fo (see FIG. 7B) corresponds to a phase error Ep2 (see FIGS. 7B and 7C) between the eighth harmonic clock 8fo and the horizontal synchronization signal BD (see FIG. 7C). The horizontal synchronization signal edge detection pulse BDE is input to an input terminal J of the JK-F/F 62, and the first horizontal synchronization output BDS (not shown) from the JK-F/F 62 is input to the inverting reset terminal of the counter 64. When, therefore, the first horizontal synchronization output BDS is set at high level, the reset state of the counter 64 is canceled.

Figure 7H:
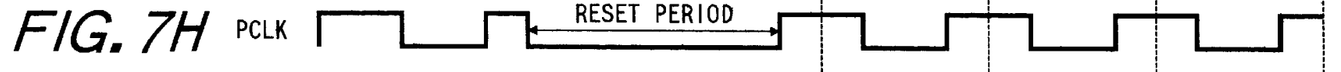
Figure 7I:
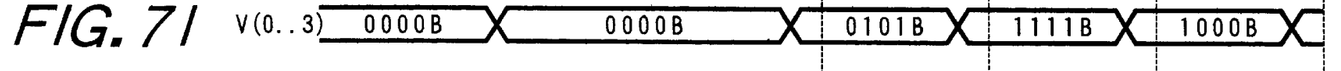
Figure 7J:
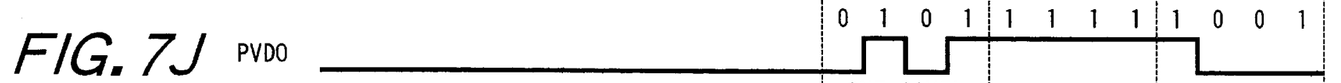
Figure 7K:
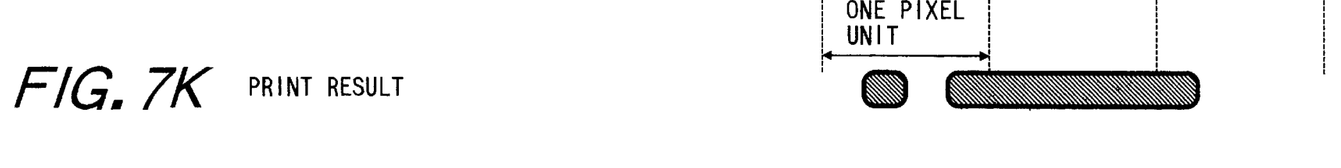

At the same time, the second horizontal synchronization output $\overline{BDS}$ (see FIG. 7E) obtained by inverting the logic value of the first horizontal synchronization output BDS using the inverter 63 is set at low level to reset the half frequency dividing circuit 35 and the quarter frequency dividing circuit 36, thereby temporarily stopping the generation of a fourth harmonic clock 4fo (see FIG. 7G) and an image processing clock PCLK (see FIG. 7H). When the counter 64 counts a predetermined number of clock pulses of the eighth harmonic clock 8fo (see FIG. 7B) and outputs the carry signal CR (see FIG. 7F), the first horizontal synchronization output BDS from the JK-F/F 62 is set at low level to reset the counter 64. As a result, the second horizontal synchronization output $\overline{BDS}$ is set at high level to cancel the reset states of the half frequency dividing circuit 35 and the quarter frequency dividing circuit 36.

When the reset state is canceled, the half frequency dividing circuit 35 resumes half frequency division of the eighth harmonic clock 8fo and outputs the fourth harmonic clock 4fo again. At the same time, the quarter frequency dividing circuit 36 resumes quarter frequency division of the fourth harmonic clock 4fo and outputs the image processing clock PCLK again, thus obtaining the image processing clock PCLK which has the same frequency as that of the output fo from the half quarter frequency dividing pre-scaler 34, i.e., a reference clock fr (see FIG. 7A), and is synchronized with the leading edge of the horizontal synchronization signal BD.

Meanwhile, image data VDO (0, . . . , 3) is latched by the latch circuit 37 at the leading edge of the image processing clock PCLK, and is output as 600-dpi, 4-bit parallel image data V (0, . . . , 3) (see FIG. 7I) at the same period as that of the image processing clock PCLK which is delayed with respect to the leading edge by a predetermined period of time. The image data V (0, . . . , 3) is parallel/serial-converted into a 2,400-dip, 1-bit serial image modulating signal PVDO (see FIG. 7J) by the parallel/serial conversion circuit 38. The semiconductor laser 80 emits light in accordance with a laser drive signal from the laser drive circuit based on this image modulating signal PVDO, thereby obtaining a print result like the one shown in FIG. 7K in the main scan direction.

According to this embodiment, the same effects as those of the first embodiment can be obtained. In addition, since the respective blocks of the BD synchronization unit 65 are integrated into the IC 60, the respective circuit blocks can be easily integrated. This arrangement is therefore suitable for an IC. Since only a small number of components need to be externally connected to the IC, the circuit arrangement of the printer engine 2a can be simplified. Therefore, the size and cost of the apparatus can be easily reduced. In addition, as is apparent, the second embodiment allows changes and modifications similar to those described with reference to the first embodiment.

In each embodiment described above, the image processing clock PCLK is sent to the printer controller 1, and the printer controller 1 outputs the image data VDO (0, . . . , 3) in synchronism with the image processing clock PCLK. However, the printer controller 1 may output the image data VDO (0, . . . , 3) together with a pixel clock in synchronism therewith.

In this case, the printer engine 2 or 2a includes a latch circuit for latching the image data VDO (0, . . . , 3) on the basis of the sent pixel clock so as to read out the image data VDO (0, . . . , 3) in synchronism with the image processing clock PCLK from the latch circuit. Such a latch circuit can be arranged in the IC 11 or 60.

In each embodiment described above, parallel/serial conversion of input image data is performed as pixel modulation processing. However, for example, input image data may be converted into an image modulating signal having a pulse width corresponding to the value of the image data. In this case, a component (e.g., a ROM) for converting input image data into data representing a pulse width corresponding to the value of the data is arranged between the latch circuit 37 and the parallel/serial conversion circuit 38, and the division numbers in the frequency dividing circuits 34 to 36 are set to proper values.

The following shows an example of how 3-bit input image data is converted:

| Input Image Data | Converted Data |
| --- | --- |
| 0 (000) | 0000000 |
| 1 (001) | 0001000 |
| 2 (010) | 0011000 |
| 3 (011) | 0011100 |
| 4 (100) | 0111100 |
| 5 (101) | 0111110 |
| 6 (110) | 1111110 |
| 7 (111) | 1111111 |

In the above case, for example, a 1/14 frequency dividing pre-scaler is used as the pre-scaler 34, and a 1/7 frequency dividing circuit is used as the frequency dividing circuit 36.

In the above case, each input image data consists of three bits. However, each input image data may consists of a different number of bits. In addition, input image data need not always be converted into data representing a pulse width, but may be converted into data in another form.

As has been described above, according to the above embodiments, a high-frequency clock having a frequency n times that of an image processing clock is generated by an inexpensive arrangement, and the phase error between the horizontal synchronization signal and the image processing clock is set to 1/n or less the image processing clock period, thereby controlling the image formation start timing with a precision of 1/n dot.

More specifically, each embodiment described above includes a high-frequency clock generating means for generating a high-frequency clock having a frequency n (n is an integer that satisfies n≧2) times that of an oscillation output from a reference oscillator, an image processing clock generating means for generating an image processing clock on the basis of the high-frequency clock and a detection signal from a scan light detecting means such that the image processing clock is synchronized with the detection signal, and a modulating means for generating an image modulating signal by modulating an image signal on the basis of the high-frequency clock. In this arrangement, a light source is driven on the basis of the image modulating signal. Therefore, the image formation start timing can be controlled with a precision of 1/n dot with an inexpensive arrangement without requiring any expensive quartz oscillating circuit having a high oscillation frequency.

The present invention is not limited to the above embodiments, and various changes and modifications can be made within the scope of the appended claims.

What is claimed is:

1. An image forming apparatus having scanning means for scanning a rotating photosensitive member with light modulated on the basis of an image modulating signal and emitted from a light source, and scan light detecting means, placed at a predetermined position, for detecting scan light from said scanning means, comprising:

a reference oscillator for outputting an oscillation having a frequency fr;

high-frequency clock generating means for generating a high-frequency clock on the basis of the oscillation output by said reference oscillator, the high-frequency clock having a frequency of (n×fr) where n is an integer that satisfies n≧2;

image processing clock generating means for generating an image processing clock synchronized with a detection signal from said scan light detecting means on the basis of the high-frequency clock and the detection signal; and modulating means for generating the image modulating signal by modulating the image signal on the basis of the high-frequency clock, wherein said light source is driven on the basis of the image modulating signal.

2. An apparatus according to claim 1, wherein said high-frequency clock generating means comprises a phase-locked loop circuit for performing control to generate the high-frequency clock phase-locked to an oscillation output from said reference oscillator.

3. An apparatus according to claim 2, wherein said phase-locked loop circuit comprises phase comparing means for receiving the oscillation output or a frequency division output of a frequency dividing means as a reference signal, a voltage-controlled oscillator for changing an oscillation output frequency on the basis of an output error signal from said phase comparing means, the frequency dividing means performing 1/n frequency division of an oscillation output from said voltage-controlled oscillator and supplying the resultant signal as a comparison signal to said phase comparing means.

4. An apparatus according to claim 1, wherein said high-frequency clock generating means comprises reference oscillation frequency dividing means for frequency-dividing an oscillation output from said reference oscillator, and a phase-locked loop circuit for generating the high-frequency clock phase-locked to a frequency division output from said reference oscillation frequency dividing means.

5. An apparatus according to claim 1, wherein said image processing clock generating means comprises synchronization signal generating means for generating a synchronization signal phase-locked to the detection signal, and high-frequency clock frequency dividing means for generating an image modulating clock by frequency-dividing the high-frequency clock when the synchronization signal has a predetermined logic value, and stopping generation of the image modulating clock when the synchronization signal has another logic value.

6. An apparatus according to claim 5, wherein said synchronization signal generating means comprises reset signal generating means for generating a reset signal synchronized with the detection signal, and a flip-flop which has a data input terminal set at high level and outputs the synchronization signal on the basis of the reset signal and the detection signal.

7. An apparatus according to claim 5, wherein said synchronization signal generating means comprises an edge detecting circuit for detecting an edge of the detection signal in synchronism with the high-frequency clock, a counter for counting clock pulses of the high-frequency clock and outputting one pulse in a cycle of n clock pulses, and a flip-flop having an output whose logic value is inverted in accordance with the pulse and an output from said edge detecting circuit.

8. An apparatus according to claim 5, wherein said high-frequency clock frequency dividing means outputs an image modulating clock for generating the image modulating signal by performing 1/k (k is an arbitrary integer that satisfies k≦n) frequency division of the high-frequency clock, and outputs an image processing clock obtained by performing 1/m (m is an arbitrary integer that satisfies m<k≦n) frequency division of the high-frequency clock.

9. An apparatus according to claim 5, wherein said modulating means comprises a latch circuit for latching a parallel image signal in response to the image processing clock, and parallel/serial conversion means for converting an output from said latch circuit into serial data at a timing of the image modulating clock.

10. An apparatus according to claim 1, wherein said high-frequency clock generating means, said image processing clock generating means, and said modulating means are formed into an integrated circuit.

11. A system for outputting an image modulating signal to an image forming apparatus having scanning means for scanning a rotating photosensitive member with light modulated on the basis of the image modulating signal and emitted from a light source, and scan light detecting means, placed at a predetermined position, for detecting scan light from said scanning means, comprising:

a reference oscillator for outputting an oscillation having a frequency fr;

high-frequency clock generating means for generating a high-frequency clock on the basis of the oscillation output by said reference oscillator, the high-frequency clock having a frequency of (n×fr), where n is an integer that satisfies n≧2;

image processing clock generating means for generating an image processing clock synchronized with a detection signal from said scan light detecting means on the basis of the high-frequency clock and the detection signal; and modulating means for generating the image modulating signal on the basis of image data in synchronism with the high-frequency clock.

12. A system according to claim 11, wherein said high-frequency clock generating means comprises a phase-locked loop circuit for performing control to generate the high-frequency clock phase-locked to an oscillation output from said reference oscillator.

13. A system according to claim 12, wherein said phase-locked loop circuit comprises phase comparing means for receiving the oscillation output or a frequency division output of a frequency dividing means as a reference signal, a voltage-controlled oscillator for changing an oscillation output frequency on the basis of an output error signal from said phase comparing means, the frequency dividing means performing 1/n frequency division of an oscillation output from said voltage-controlled oscillator and supplying the resultant signal as a comparison signal to said phase comparing means.

14. A system according to claim 11, wherein said high-frequency clock generating means comprises reference oscillation frequency dividing means for frequency-dividing an oscillation output from said reference oscillator, and a phase-locked loop circuit for generating the high-frequency clock phase-locked to a frequency division output from said reference oscillation frequency dividing means.

15. A system according to claim 11, wherein said image processing clock generating means comprises synchronization signal generating means for generating a synchronization signal phase-locked to the detection signal, and high-frequency clock frequency dividing means for generating an image modulating clock by frequency-dividing the high-frequency clock when the synchronization signal has a predetermined logic value, and stopping generation of the image modulating clock when the synchronization signal has another logic value.

16. A system according to claim 15, wherein said synchronization signal generating means comprises reset signal generating means for generating a reset signal synchronized with the detection signal, and a flip-flop which has a data input terminal set at high level and outputs the synchronization signal on the basis of the reset signal and the detection signal.

17. A system according to claim 15, wherein said synchronization signal generating means comprises an edge detecting circuit for detecting an edge of the detection signal in synchronism with the high-frequency clock, a counter for counting clock pulses of the high-frequency clock and outputting one pulse in a cycle of n clock pulses, and a flip-flop having an output whose logic value is inverted in accordance with the pulse and an output from said edge detecting circuit.

18. A system according to claim 15, wherein said high-frequency clock frequency dividing means outputs an image modulating clock for generating the image modulating signal by performing 1/k (k is an arbitrary integer that satisfies k≦n) frequency division of the high-frequency clock, and outputs an image processing clock obtained by performing 1/m (m is an arbitrary integer that satisfies m<k≦n) frequency division of the high-frequency clock.

19. A system according to claim 15, wherein said modulating means comprises a latch circuit for latching a parallel image signal in response to the image processing clock, and parallel/serial conversion means for converting an output from said latch circuit into serial data at a timing of the image modulating clock.

20. A system according to claim 11, wherein the high frequency clock generating means, the image processing clock generating means and the modulating means are in an integrated circuit.

21. A synchronization clock generating apparatus comprising:

a reference oscillator for outputting an oscillation having a frequency fr;

high-frequency clock generating means for generating a high-frequency clock on the basis of the oscillation output by said reference oscillator, the high-frequency clock having a frequency of (n×fr) where n is an integer that satisfies n≧2; and first frequency dividing means for frequency-dividing the high-frequency clock generated by said high-frequency clock generating means in synchronism with a predetermined trigger signal.

22. An apparatus according to claim 21, wherein said clock signal generating means comprises oscillation means which oscillates at a frequency corresponding to a control signal, second frequency dividing means for frequency-dividing an output from said oscillation means, and phase comparing means for comparing a phase of an output from said second frequency dividing means with a phase of the signal having the predetermined frequency and generating the control signal to said oscillation means.

23. An apparatus according to claim 21, wherein said first frequency dividing means comprises a plurality of frequency dividing circuits for generating a plurality of synchronization clock signals having different frequencies.

24. An apparatus according to claim 21, further comprising means for synchronizing an externally input synchronization signal with a clock signal generated by said clock signal generating means and generating the predetermined trigger signal.

25. An image modulating signal generating apparatus comprising:

a reference oscillator for outputting an oscillation having a frequency fr;

high-frequency clock generating means for generating a high-frequency clock on the basis of the oscillation output by said reference oscillator, the high-frequency clock having a frequency of (n×fr) where n is an integer that satisfies n≧2;

first frequency dividing means for frequency-dividing the high-frequency clock generated by said high-frequency clock generating means in synchronism with a predetermined trigger signal;

input means for inputting image data in synchronism with an output from said first frequency dividing means; and image modulating signal generating means for generating an image modulating signal on the basis of the input image data.

26. An apparatus according to claim 25, wherein said clock signal generating means comprises oscillation means which oscillates at a frequency corresponding to a control signal, second frequency dividing means for frequency-dividing an output from said oscillation means, and phase comparing means for comparing a phase of an output from said second frequency dividing means with a phase of the signal having the predetermined frequency and generating the control signal to said oscillation means.

27. An apparatus according to claim 25, wherein said first frequency dividing means comprises a plurality of frequency dividing circuits for generating synchronization clock signals having different frequencies, said input means inputs image data in synchronism with one of the plurality of synchronization clock signals, and said image modulating signal generating means generates an image modulating signal on the basis of the input image data and the other of the plurality of synchronization clock signals.

28. An image forming apparatus comprising:

a reference oscillator for outputting an oscillation having a frequency fr;

high-frequency clock generating means for generating a high-frequency clock on the basis of the oscillation output by said reference oscillator, the high-frequency clock having a frequency of (n×fr) where n is an integer that satisfies n≧2;

first frequency dividing means for frequency-dividing the high-frequency clock generated by said high-frequency clock generating means in synchronism with a predetermined trigger signal;

input means for inputting image data in synchronism with an output from said first frequency dividing means;

image modulating signal generating means for generating an image modulating signal on the basis of the input image data; and image forming means for forming an image on the basis of the image modulating signal.

29. An apparatus according to claim 28, wherein said clock signal generating means comprises oscillation means which oscillates at a frequency corresponding to a control signal, second frequency dividing means for frequency-dividing an output from said oscillation means, and phase comparing means for comparing a phase of an output from said second frequency dividing means with a phase of the signal having the predetermined frequency and generating the control signal to said oscillation means.

30. An apparatus according to claim 28, wherein said first frequency dividing means comprises a plurality of frequency dividing circuits for generating synchronization clock signals having different frequencies, said input means inputs image data in synchronism with one of the plurality of synchronization clock signals, and said image modulating signal generating means generates an image modulating signal on the basis of the input image data and the other of the plurality of synchronization clock signals.

31. An integrated circuit comprising:

an image data input terminal;

a synchronization signal input terminal;

an image modulating signal output terminal;

a clock signal generating circuit for, on the basis of a reference oscillation, generating a clock signal having a frequency (n≧2) times a predetermined frequency of said reference oscillation; and an image modulating signal generating circuit for generating an image modulating signal on the basis of image data input through said image data input terminal and the clock signal from said clock signal generating circuit.

32. An integrated circuit according to claim 31, further comprising a first frequency dividing circuit for frequency-dividing the clock signal having the n-times frequency.

33. An integrated circuit according to claim 32, wherein said circuit for generating the clock signal having the n-times frequency comprises an oscillating circuit which oscillates at a frequency corresponding to a control signal, a second frequency dividing circuit for frequency-dividing an output from said oscillating circuit, and a phase comparing circuit for comparing a phase of an output from said second frequency dividing circuit with a phase of the signal having the predetermined frequency and generating the control signal to said oscillating circuit.

34. An integrated circuit according to claim 31, wherein said first frequency dividing circuit comprises a plurality of frequency dividing circuits for generating a plurality of synchronization clock signals having different frequencies, said integrated circuit further comprises a latch circuit for latching input image data in synchronism with one of the plurality of synchronization clock signals, and said image modulating signal generating circuit generates an image modulating signal on the basis of the image data latched by said image modulating signal generating circuit and the other of the plurality of synchronization clock signals.

35. An integrated circuit according to claim 31, further comprising means for synchronizing the synchronization signal with the clock signal having the n-times frequency.

* * * * *

UNITED STATES PATENT AND TRADEMARK OFFICE
CERTIFICATE OF CORRECTION

PATENT NO. : 6,154,246
DATED : November 28, 2000
INVENTOR(S) : Yoshimi Ogasawara et al.

It is certified that error appears in the above-identified patent and that said Letters Patent is hereby corrected as shown below:

Column 3,
Line 14, "a n" should read -- an --; and
Line 27, "pha se" should read -- phase --.

Column 5,
Line 57, "and" should read -- and for --.

Column 7,

Line 61, "1/8" should read -- $\overline{1/8}$ --.

Column 8,
Line 42, "RST" should read -- $\overline{RST}$ --.

Column 16,
Line 19, "(n≥2)" should read -- n (n≥2) --.

Signed and Sealed this

Twenty-seventh Day of November, 2001

*Attest:*

NICHOLAS P. GODICI
*Attesting Officer    Acting Director of the United States Patent and Trademark Office*